(12) United States Patent
Rubin

(10) Patent No.: US 7,925,496 B1
(45) Date of Patent: Apr. 12, 2011

(54) METHOD FOR SUMMARIZING NATURAL LANGUAGE TEXT

(75) Inventor: Stuart Harvey Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1023 days.

(21) Appl. No.: 11/789,129

(22) Filed: Apr. 23, 2007

(51) Int. Cl.
*G06F 17/28* (2006.01)
(52) U.S. Cl. .................. 704/7; 704/8; 704/9; 704/10
(58) Field of Classification Search .............. 704/7–10
See application file for complete search history.

(56) References Cited

U.S. PATENT DOCUMENTS

| | | | |
|---|---|---|---|
| 6,317,708 B1 | 11/2001 | Witbrock et al. | |
| 6,338,034 B1 | 1/2002 | Ishikawa et al. | |
| 6,537,325 B1 | 3/2003 | Nishizawa | |
| 2001/0056445 A1* | 12/2001 | Meystel et al. | 707/513 |
| 2002/0046018 A1* | 4/2002 | Marcu et al. | 704/9 |
| 2002/0143739 A1* | 10/2002 | Makino et al. | 707/1 |
| 2003/0130837 A1* | 7/2003 | Batchilo et al. | 704/9 |
| 2003/0163790 A1 | 8/2003 | Murata | |
| 2004/0225667 A1* | 11/2004 | Hu et al. | 707/100 |
| 2005/0086592 A1* | 4/2005 | Polanyi et al. | 715/512 |
| 2005/0102619 A1* | 5/2005 | Hijikata et al. | 715/530 |
| 2005/0210009 A1* | 9/2005 | Tran | 707/3 |
| 2006/0036596 A1* | 2/2006 | Zhang et al. | 707/5 |
| 2006/0184516 A1* | 8/2006 | Ellis | 707/3 |
| 2006/0282469 A1* | 12/2006 | Pan | 707/200 |
| 2007/0011133 A1* | 1/2007 | Chang | 707/1 |

* cited by examiner

*Primary Examiner* — Leonard Saint Cyr
(74) *Attorney, Agent, or Firm* — Ryan J. Friedl; Kyle Eppele

(57) ABSTRACT

A method includes the steps of comparing a first body of text with a user-created summary of the first body of text, creating rules based on the comparison of the first body of text with the user-created summary of the first body of text, selecting one or more summary rules for generating a computer-created summary of a second body of text, and applying the selected summary rules to the second body of text to generate a computer-created summary of the second body of text. The first body of text may be a user-corrected summary of a computer-created summary of the first body of text. The rules may be selected based on previous use, frequency of use, context of the body of text, or most-specific applicability. The rules may be iteratively applied to generate a summary. A method is also provided for generating a heading for a summary of text.

6 Claims, 12 Drawing Sheets

METHOD FOR SUMMARIZING NATURAL LANGUAGE TEXT

FEDERALLY-SPONSORED RESEARCH AND DEVELOPMENT

The Method for Summarizing Natural Language Text was developed with federal funds and is assigned to the United States Government. Licensing and technical inquiries may be directed to the Office of Patent Counsel, Space and Naval Warfare Systems Center, San Diego, Code 20012, San Diego, Calif., 92152; telephone (619) 553-3201, facsimile (619) 553-3821. Reference Navy Case No. 98324.

BACKGROUND OF THE INVENTION

The embodiments of the invention relate generally to the field of text summarizers.

Text summarizers are software programs used to transform a body of text into a generally shorter and more concise body of text. Such programs assist with activities such as news reporting, financial reporting, and legal analysis. Text summarizers typically require a user to program the summarization rules into the software if the summarizer is not adequately summarizing text. This process is time consuming, error-prone, burdensome, and requires a proficient level of programming knowledge. Further, traditional body of text summarizers do not offer the flexibility to adapt to the writing style of particular individuals.

Therefore, there is a current need for a text summarizer that may automatically learn summarization rules based on user input and implement the summarization rules without user programming.

DETAILED DESCRIPTION OF SOME EMBODIMENTS

Figure 1:
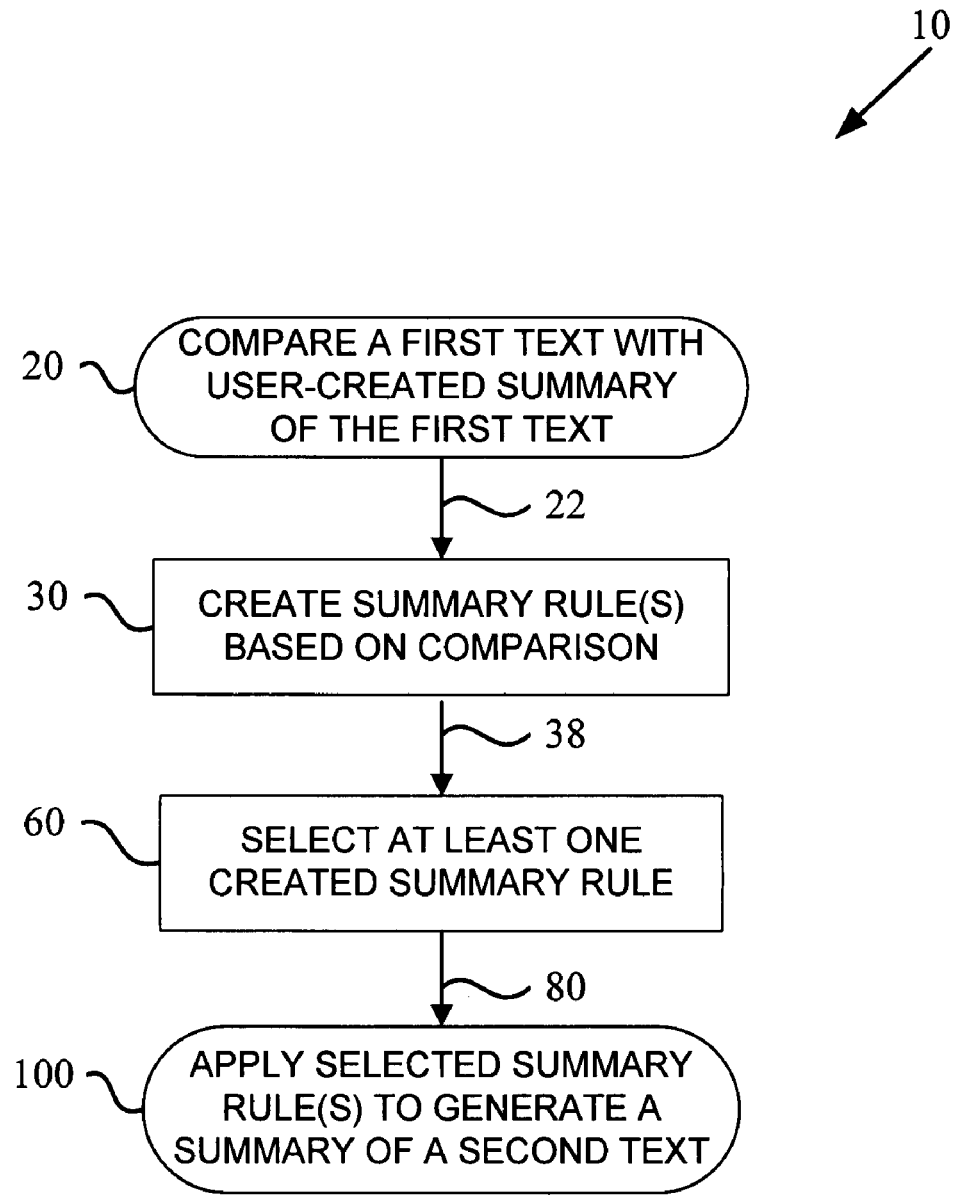
FIG. 1 illustrates a flow diagram of an embodiment of the method for summarizing natural language text.

Referring to FIG. 1, there is shown a flow diagram of an embodiment of the method for summarizing natural language text 10. Method 10 may begin at step 20, where a first body of text is compared with a user-created summary of the first body of text. The first body of text may be any body of natural language text in any language. Natural language text may be all text that is not solely machine readable. Examples of natural language bodies of text may include newspaper articles, books, criminal incident reports, and email body of texts. The first body of text may be a computer-created body of natural language text, such as a summary of a body of natural language text. The user-created summary of the first body of text may be a user-corrected summary of a computer-created summary of the first body of text. Step 30 may involve creating one or more summary rules based on the comparison of the first body of text with the user-created summary of the first body of text. Next, step 60 may involve selecting at least one of the one or more summary rules for generating a computer-created summary of a second body of text. Method 10 may then proceed to step 100, where the selected summary rules are applied to the second body of text to generate a computer-created summary of the second body of text.

Figure 2:
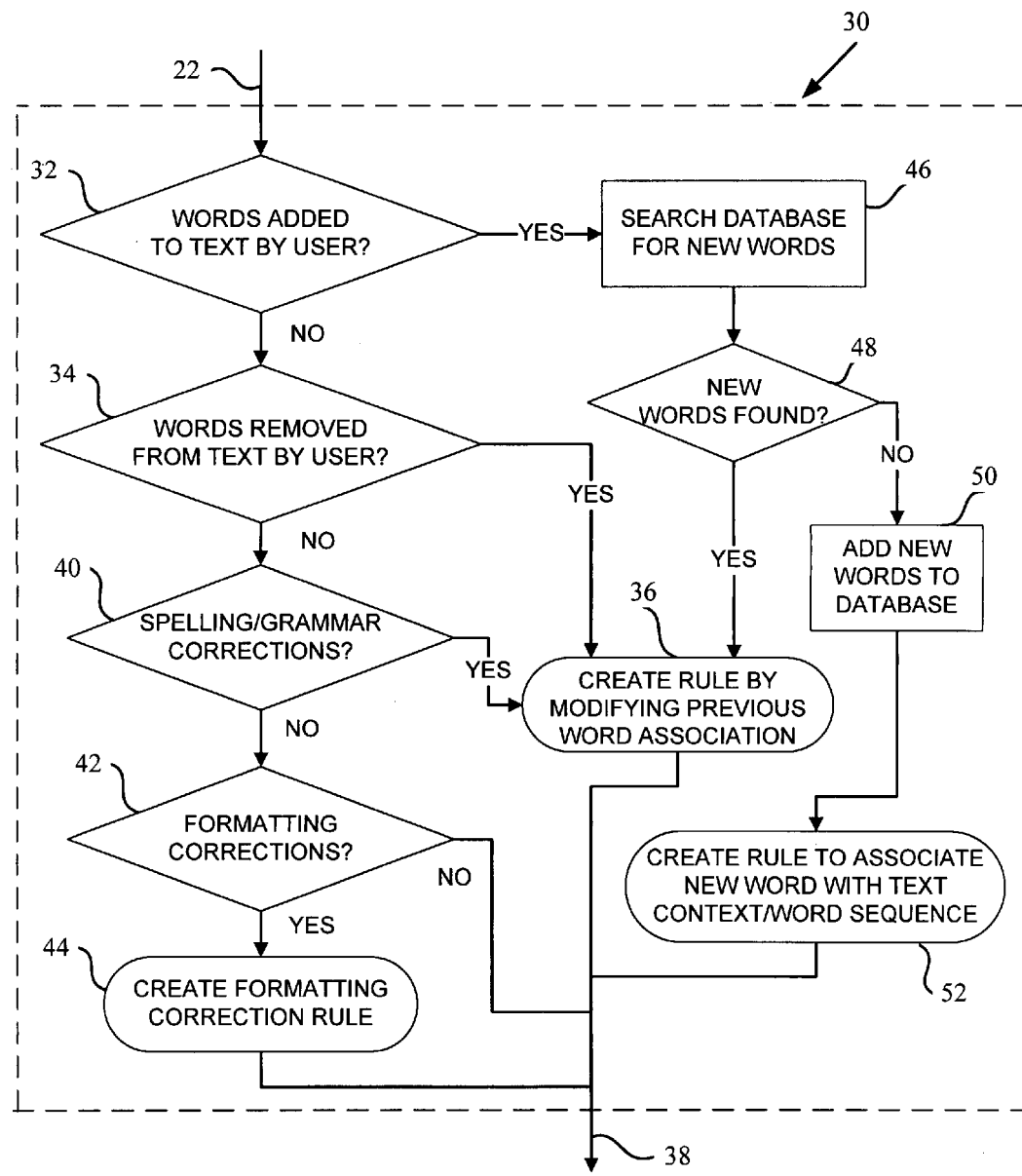
FIG. 2 illustrates a flow diagram of steps for creating summary rules according to an embodiment of the method for summarizing natural language text.

FIG. 2 illustrates a flow diagram of an embodiment of step 30 of method 10. As indicated by flow path 22, step 30 may begin at step 32, where a determination is made, based on the comparison in step 20, whether any additional words appear in the user-created summary that do not appear in the computer-created summary. If no additional words appear, step 34 involves a determination as to whether any words were removed from the computer-created summary and do not appear in the user-corrected summary. If so, step 36 involves the creation of one or more new summary rules to account for the removal of words from the computer-created summary by the user. The creation of the new summary rule may occur by modifying one or more previous word associations to reflect the user change or by creating a separate summary rule. Following step 36, step 30 ends and method 10 may proceed to step 60 via flow path 38.

Referring back to step 34, if a determination is made that no words were removed from the computer-created summary by a user, step 30 proceeds to step 40, where a determination is made whether any spelling and/or grammar corrections were made to the computer-created summary by a user. If corrections were made, step 30 proceeds to create a new rule at step 36. If no corrections were made, step 30 proceeds to step 42, where a determination is made whether any formatting corrections were made to the computer-created summary. Underlining, bolding, and italicizing are some examples of formatting corrections. If formatting corrections were made by a user, step 30 creates a formatting correction rule at step 44. Following step 44, step 30 ends and method 10 may proceed to step 60 via flow path 38. If no formatting corrections have been made, step 30 concludes and method 10 may proceed to step 60 via flow path 38. A determination that no formatting corrections have been made is a determination that no corrections have been made by the user such that a new rule needs to be created by method 10.

Referring back to step 32, if a determination is made that words are contained within the user-modified summary that do not appear in the computer-created summary, step 30 proceeds to step 46. At step 46, a database is searched for the new words. The database may be a knowledge base, associative memory, or other data storage. The words may be stored in the database or other data storage based on frequency of occurrence in a selected number of other previously examined bodies of texts. After step 46, step 48 involves a determination whether the new words were found in the database. If the new words are found, step 30 proceeds to step 36 where a new rule is created by modifying a previous rule associated with that word. If the new words are not found, step 30 proceeds to step 50 where the new words are added to the database. Next, step 52 involves the creation of a new rule to associate the new word with the text context and/or word sequence of the original body of text. Following step 52, step 30 ends and method 10 may proceed to step 60 via flow path 38.

Figure 3:
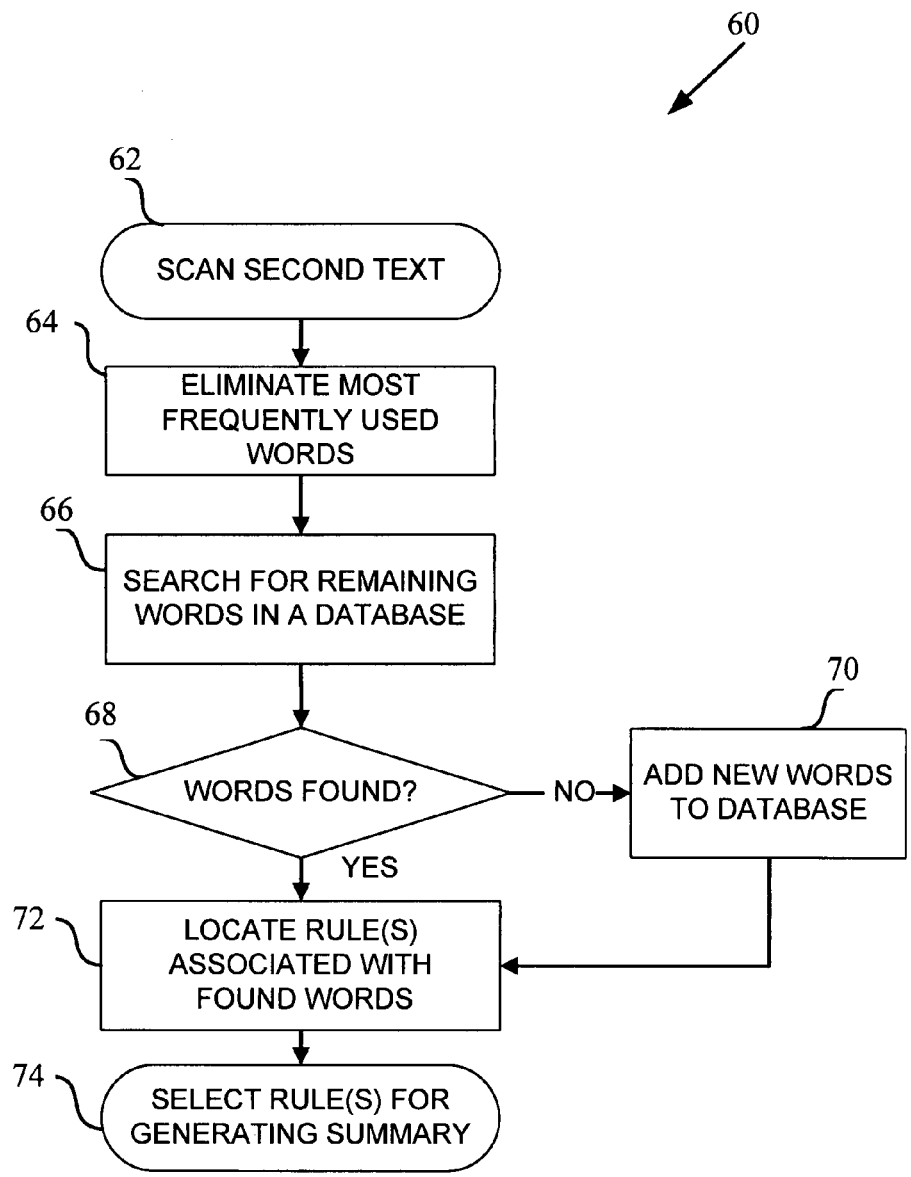
FIG. 3 illustrates a flow diagram of steps for selecting summary rules according to an embodiment of the method for summarizing natural language text.

FIG. 3 illustrates a flow diagram of an embodiment of step 60 of method 10. Step 60 may begin at step 62, where a second body of text is received from a source and scanned. The source may be any person, entity, computer, or other means of delivering a body of text. The second body of text is a different body of text than the first body of text and may be any body of natural language text in any language. Natural language text may be all text that is not solely machine readable. Examples of natural language bodies of texts include newspaper articles, books, criminal incident reports, and emails. The body of text received may be of various word lengths. In one embodiment, the body of text may contain 100-200 words. In other embodiments, the bodies of natural language text may contain fewer words or more words. In some implementations of method 10, the entire body of text may be scanned before step 60 proceeds. In other implementations, only a portion of the body of text may be scanned before step 60 proceeds. A portion may comprise a few words, a group of words, sentences, paragraphs, or pages of text. After a body of text is received, the words may be normalized to better reflect the true commonality of their semantics. For example, the word "hi" may be normalized to the word "hello" to reflect the use of a word with the same meaning as "hello". Normalization ensures accurate word semantic-frequency determinations. Further, sentence normalization may also occur to improve the quality of English usage from user-supplied sentential corrections. Normalized sentences provide for more effective use of word frequency counts because the sentences randomize the representation of sentential semantics having the same relative frequency and context of use, while syntax may be different.

Next, step 64 may involve eliminating from the body of text the most frequently used words that do not relate to the specific context of the body of text. Eliminating the most frequently used words may produce an altered body of natural language text that comprises the least frequently used words. For example, step 64 may involve the elimination of words such as "a, an, in, of, to, and the" from the body of text. The most frequently used words may be stored in a database or other data storage medium based on frequency of occurrence in a selected number of other body of texts. In some embodiments, special purpose hardware, such as associative memory, may be used to store the most frequently used words. As another example, a domain-dictionary hash table may be created and maintained to keep a global frequency count of the words and/or word sequences encountered in the body of texts. One embodiment of step 60 does not track numbers, addresses, dates, and data of a similar kind in the hash table. The hash table may be implemented using a transposition, least-frequently used, abstract data type methodology to limit spatial requirements. Words and/or word sequences may be stored in the hash table where the top position is designated as, n, where n is the limiting size of the hash table. Each entry may be associated with an ordered pair (i.e. length, position), where the position number is necessarily unique. The first position to be filled is assigned n for its position number. The use of transposition enables the updating of recorded positions by swapping them. The hash queue is filled from the bottom until "n" entries have been made. Thereafter, a word and/or word sequence may replace the first word and/or word sequence encountered in a bottom-up search if and only if its length is less than or equal to that of the one it replaces. If the list length is limited, the least frequently used words may be deleted from the bottom of the list.

The words and/or word sequences stored in the data storage may be stored based on the frequency of occurrence within a plurality of previously examined bodies of text. In one embodiment of step 60, the previously examined bodies of text may be related to the body of text to be summarized. For example, the body of text to be summarized may be contextually related to the previously examined bodies of text. Each time a body of text is scanned that has not been previously scanned the words and/or word sequences in the hash table or other storage medium are updated to reflect the occurrence of each word and/or word sequence in the body of text. Each scanned word in the body of text may be associated with a frequency of occurrence value from the hash table. In an embodiment using a hash table, the relative frequency of occurrence may be determined by a word's positioning within the hash table. As an example, the most frequently occurring words will have higher positions within the hash table. Each word that does not have a frequency value above a certain threshold will be removed from the body of text. The words are processed in order by hashing the constituent words in non-increasing order of length of word sequence (i.e., a most-specific-first paradigm). These subsequences are deterministic. There are $n(n+1)/2$ subsequences for n words in a sentence.

After enumerating, each subsequence, including spaces, is hashed to see if it is found in the domain-dictionary table. If it is found, the matched subsequence is transposed up one and its position is increased by one. If not found, it is added to the table. Each word or sequence of words is paired with its starting position number in the domain-dictionary hash table. If the starting position number is not found, zeros are assigned to the position number for the word or sequence of words, meaning that the words or sequence of words have not occurred before in a body of text. Words or word sequences that contain zeros for position number are the last words to be eliminated from the body of text to produce searchable words/keywords/sequence of words.

The frequency of occurrence threshold level may vary depending on the level of summarization desired by the user. For example, users that desire short and broad summaries of lengthy bodies of text may set the threshold level very low, so only the words that rarely appear in bodies of text will remain in the body of text. A low threshold level ensures that the words that remain in the body of text are unique to the particular body of text. If a high threshold level is set, many words will not be eliminated because they occur frequently. A high threshold level may allow for the creation of lengthy and more detailed summaries of bodies of text. Step 64 may also include the step of eliminating commonly used expressions from the body of text that do not relate to the specific context of the body of text. For example, step 64 may involve the elimination of expressions such as "on the other hand", "by the way", and other frequently used expressions.

After the most frequently occurring words and/or expressions have been eliminated from the body of text, the resulting altered body of natural language text will comprise words that more specifically reflect the particular subject matter embodied by the body of text. These remaining words may then be used to determine the rules for summarizing the body of text. At step 66, step 60 searches a database, hash table, associative memory, or other data storage for one or more of the remaining words. In one embodiment, this data storage may be the same data storage as that which contains the frequency of occurrence values. In another embodiment, this data storage may be a separate data storage, such as a least frequently used word data storage containing least frequently used words. In one embodiment, some of the remaining words are concatenated and combined into keywords and each keyword may be searched for in the database. The keywords may serve as a memory for the original sentence from which the words were combined. In another embodiment, each of the remaining words may be searched for in the database separately. In a further embodiment, several words are combined into strings or groups of words, with each string or group of words searched for in the database. The remaining words may be combined using various methods, such as a combination by sequence of occurrence in the text or a combination according to the context within which the word is used.

Step 68 next involves making a determination as to whether the remaining word or words are found within the database. If the word or words are not found, step 70 involves adding the words to the database. The words that are added to the database will have a low frequency of occurrence value because they were not located in the database. After the words are added, or if the words are found in the database, step 60 next locates the summary rules associated with each of the found word or words at step 72. While there may be one or more summary rules associated with each word, unless the words were newly added, there may also be summary rules that are not triggered by the appearance of one word. For example, a string or group of words may be required to exist before a summary rule may be applied. The summary rules are created from previously generated summaries. In one embodiment, numerous cohesive bodies of text must be received and processed to create summary rules to be used by step 60. The summary rules govern the language to be used in the generated summary. For example, a summary rule may be created such that when the word "gun" appears in the context of a body of text about crime, a summary rule associated with the word "gun" may cause the language "violent crime" to be included in a generated summary of the body of text. Next, step 74 involves selecting the summary rules for generating the summary. Step 74 involves determining which of the located summary rules to apply to generate the summary, and is explained more with reference to FIG. 4.

Figure 4:
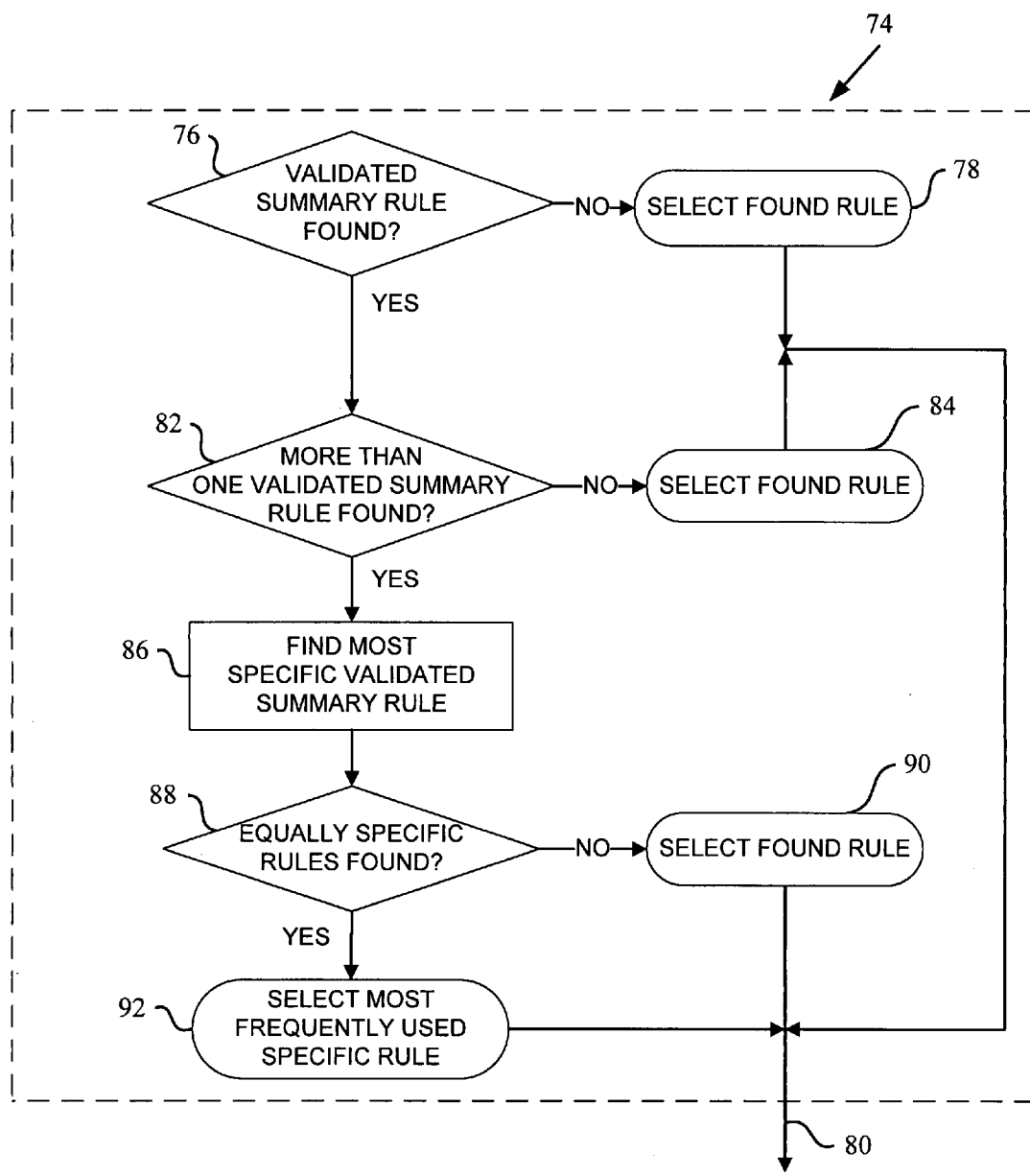
FIG. 4 illustrates a flow diagram of steps for selecting summary rules according to an embodiment of the method for summarizing natural language text.

FIG. 4 illustrates a flow diagram of an embodiment of step 74. In one implementation, the summary rules are selected based upon the words and/or group of words of the body of text. Step 74 may begin at step 76, where it is determined whether a validated summary rule is found. A validated summary rule is a summary rule that has been created and correctly used at least once in the generation of a computer-created summary. A computer-created summary is a summary of a body of text that is created by a computer running software encompassing an embodiment of method 10 or having an embodiment of method 10 stored on a removable storage device operatively connected to the computer. If a validated summary rule is not found, step 78 involves selecting the most specific non-validated summary rule. Non-validated summary rules are summary rules that have been created, but have not been used in the generation of a computer-created summary. In one implementation of method 10, the non-validated summary rules do not conflict with the validated summary rules, meaning that the non-validated summary rules are not contrary to, or in any way in disagreement with, the validated summary rules. After step 78, step 74 concludes, and method 10 may proceed to step 100 along flow path 80. Referring back to step 76, if a validated summary rule is found, step 82 next involves a determination as to whether more than one summary rule is found in the database or data storage. If not, meaning that only one summary rule was found, step 84 involves selecting the summary rule found. After step 84, step 74 concludes, and method 10 may proceed to step 100 along flow path 80.

If more than one summary rule is found in the database, step 86 involves finding the most specific summary rule. The most specific summary rule covers the broadest context of the body of text. The application of the most specific summary rule will provide the optimum and most efficient computer-created summarization for a given body of text. Step 88 next involves a determination as to whether equally specific rules have been found. If not, there is one most specific summary rule, which is selected at step 90. After step 90, step 74 concludes, and method 10 may proceed to step 100 along flow path 80. If equally specific summary rules have been found, step 92 involves selecting the most frequently used specific summary rule. The database or knowledge base where the summary rules are stored, or a separate data storage, may contain information indicative of how frequently a particular summary rule is used in the generation of a computer-created summary. After the most frequently used most specific summary rule has been selected at step 92, step 74 concludes, and method 10 may proceed to step 100 along flow path 80.

Figure 5:
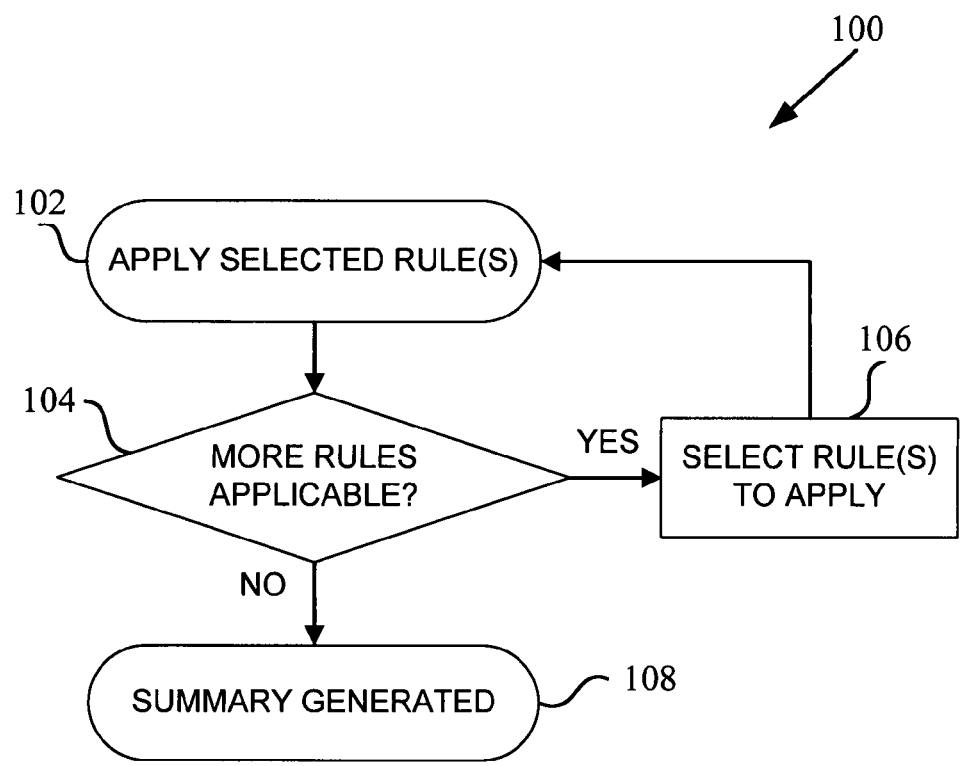
FIG. 5 illustrates a flow diagram of steps for applying selected summary rules to generate a summary according to an embodiment of the method for summarizing natural language text.

FIG. 5 illustrates a flow diagram of an embodiment of step 100. Step 100 involves applying the selected summary rules to the second body of text to generate a computer-created summary of the second body of text. Step 100 may begin at step 102, where the selected summary rules are applied to the second body of text. Application of the selected rule may modify the text to produce a partial or complete summary of the body of text. The level of summarization performed may vary depending on the scope of applicability of the rule applied. For example, broad rules may be applied that drastically summarize the body of text, whereas narrow rules may be applied that perform minor summarization of the body of text. In one implementation, a rule may be applied to the body of text before the entire body of text is scanned. For example, if a portion of the body of text is scanned and a rule is selected based upon the scanned portion, the selected rule can be applied before the rest of the text is scanned. Step 102 may involve the application of the selected rules in the proper sequence to produce the summary. In one embodiment, step 102 may involve iteratively applying the selected rules based on the context and/or sequence of the words of the body of natural language text. This iterative application of the rules may involve applying various selected rules, one or more times, in a particular sequence or not in a particular sequence, to produce a completed summary. In other embodiments, step 102 may involve iteratively applying the selected rules based upon rule validation status, specific relation of the selected rules to the context of the words of the second body of text, and/or frequency of use of the selected rules to generate computer created summaries of text.

After step 102, step 104 involves a determination whether more rules may be applied to the second body of text in the generation of a summary of the second body of text. The determination at step 104 may be made by scanning the rule database or other rule storage to determine if more rules may be applied to the second body of text. In another embodiment, step 104 may proceed in the same manner as step 60 to determine a rule to select. If more rules may be applied, step 106 involves selecting the rules to apply to the second body of text. Following step 106, step 100 proceeds to step 102 where the newly selected rules may be applied to the second body of text. Step 100 may be iteratively repeated until a determination is made at step 104 that there are no more rules that may be applied to generate a summary of the body of text, meaning that the body of text has been fully summarized according to the available rule base. If it is determined at step 104 that there are no more applicable rules for generating a summary of the second body of text, method 100 concludes at step 108, where it is determined that a correct summary has been generated by the algorithm.

The summary may be a computer-created summary produced by a computer having method 10 stored thereon or stored on a removable storage device operatively connected to the computer. A computer may be any machine that can be programmed to manipulate data and/or symbols. In one embodiment, the proper sequence of applying the summary rules may be determined by the order in which the words/keywords associated with the summary rules appear in the modified body of text. In this embodiment, the context-free words/keywords may serve as an associative memory for the original body of text sentences. During the summary generation process, the language associated with each rule may be normalized to ensure proper English language usage. Spelling and punctuation may be corrected during the summary generation process after the language has been properly ordered.

Figure 6:
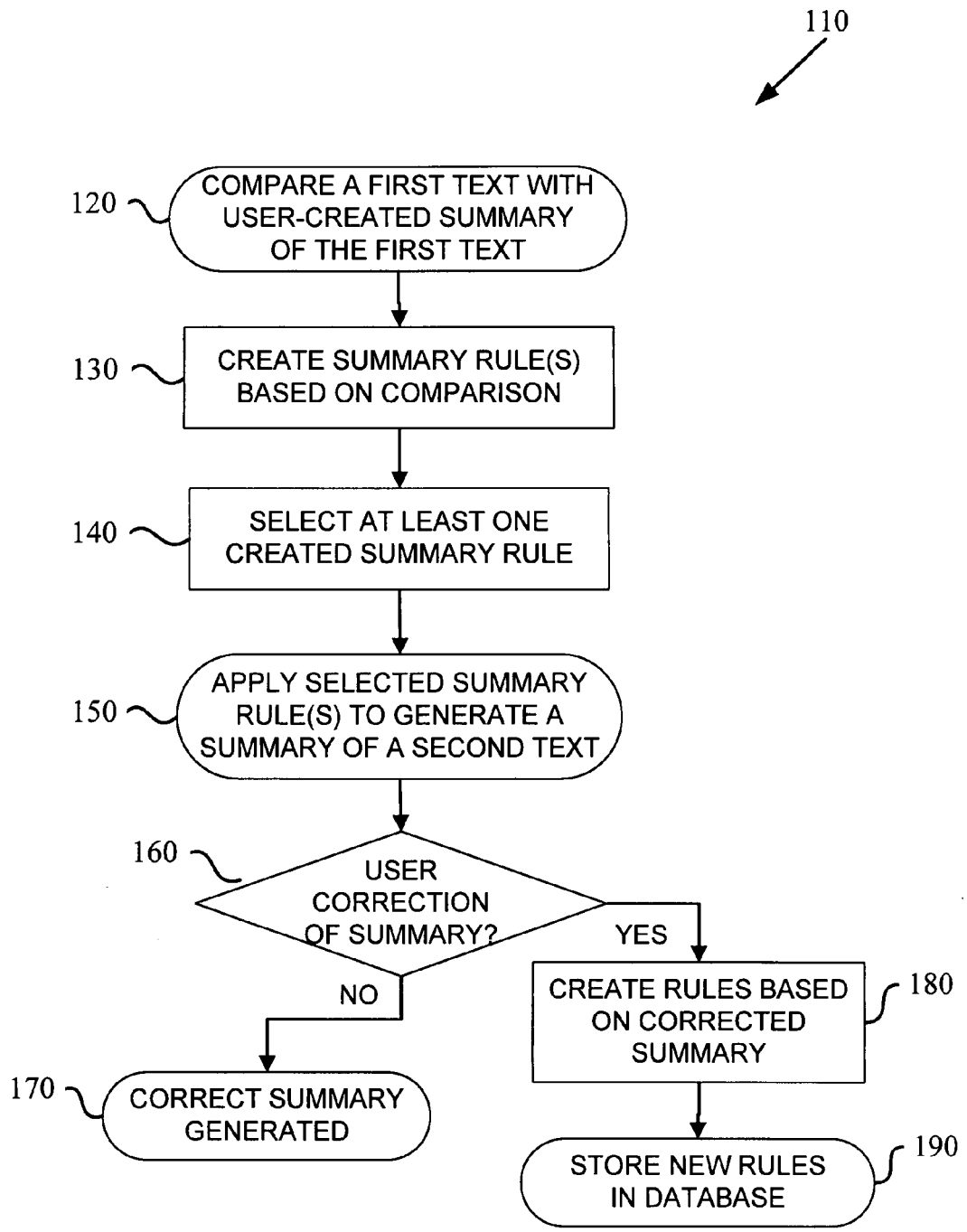
FIG. 6 illustrates a flow diagram of another embodiment the method for summarizing natural language text.

FIG. 6 illustrates a flow diagram of another embodiment the method for summarizing natural language text 110. Method 110 may begin at step 120, where a first body of text is compared with a user-created summary of the first body of text. The first body of text may be any body of natural language text in any language. Natural language text may be all text that is not solely machine readable. Examples of natural language body of texts include newspaper articles, books, criminal incident reports, and email body of texts. Next, step 130 may involve creating one or more summary rules based on the comparison of the first body of text with the user-created summary of the first body of text. Following step 130, step 140 may involve selecting at least one of the one or more summary rules for generating a computer-created summary of a second body of text. Method 10 may then proceed to step 150, where the selected summary rules are applied to the second body of text to generate a computer-created summary of the second body of text. Steps 120, 130, 140, and 150 may be performed in the same manner as their respective steps of method 10, namely steps 20, 30, 60, and 100.

Following step 150, method 110 may proceed to step 160. Step 160 may involve determining whether a user has corrected the computer-created summary. In one implementation, user correction may only occur when the program is in "learn mode". If the program is not in "learn mode", the program may generate summaries that may not be edited by a user. If a user has not corrected the summary, step 170 may involve a conclusion that the method has generated a correct summary. If a user has corrected the summary, step 180 involves creating new summary rules based on the user modifications or corrections to the computer-created summary. As used herein, the term modified may include created. Similarly, the modification of existing rules falls within the scope of rule creation as performed in step 180. Summaries that have been corrected by a user are referred to herein as "user-corrected summaries". Step 180 may involve modifying existing summary rules or creating new summary rules. One implementation of step 180 may proceed in the same manner as step 30 of method 10. Finally, method 110 may conclude with the new summary rules being stored in the database, knowledge base, associative memory, or other data storage at step 190. The summary rules may be stored within the data storage such that they are associated with one or more words, keywords, strings of words, and/or combinations thereof.

The level of assistance provided by method 10 and/or method 110 to assist a user in automatically writing a body of text summary may be measured by the equation $f(s,t)=1-e^{-st}$. The variable s is a domain symmetry constant of proportionality, where $s \geqq 0$. The greater the value of s, the more inherently compressible (i.e., symmetric) is the totality of body of text cases learned. The variable t represents relative time, where $t \geqq 0$. The variable f is a relative metric showing the degree of autonomous correct summarization (i.e., where 1.0 denotes 100%) that occurs as a result of machine learning by method 10 and/or method 110. The equation $f(s,t)=1-e^{-st}$ may be used to plot a desired learning chart of method 10 and/or method 110.

Figure 7:
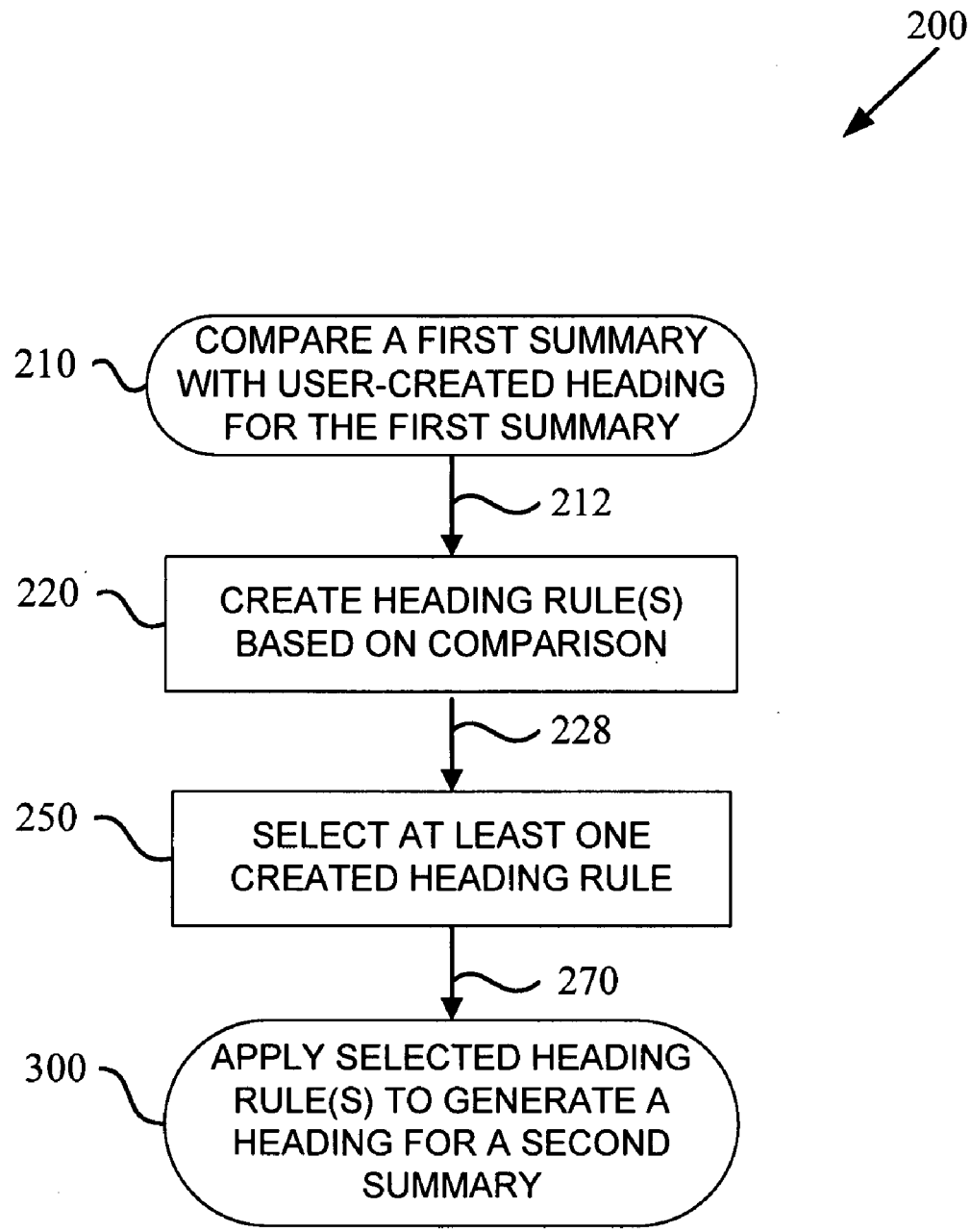
FIG. 7 illustrates a flow diagram of an embodiment of a method for generating a heading of a summary according to the method for summarizing natural language text.

Referring to FIG. 7, there is shown a flow diagram of an embodiment of a method for generating a heading of a summary 200. Method 200 may begin at step 210, where a first summary is compared with a user-created heading of the first summary. The first summary may be any summary of natural language text in any language. Natural language text may be all text that is not solely machine readable. Examples of natural language bodies of text may include newspaper articles, books, criminal incident reports, and email body of texts. The first summary may be a computer-created summary. The user-created heading of the first summary may be a user-corrected heading of a computer-created heading of the first summary. Step 220 may involve creating one or more heading rules based on the comparison of the first summary with the user-created heading of the first summary. Next, step 250 may involve selecting at least one of the one or more heading rules for generating a computer-created heading of a second summary. Method 200 may then proceed to step 300, where the selected heading rules are applied to the second summary to generate a computer-created heading of the second summary.

Figure 8:
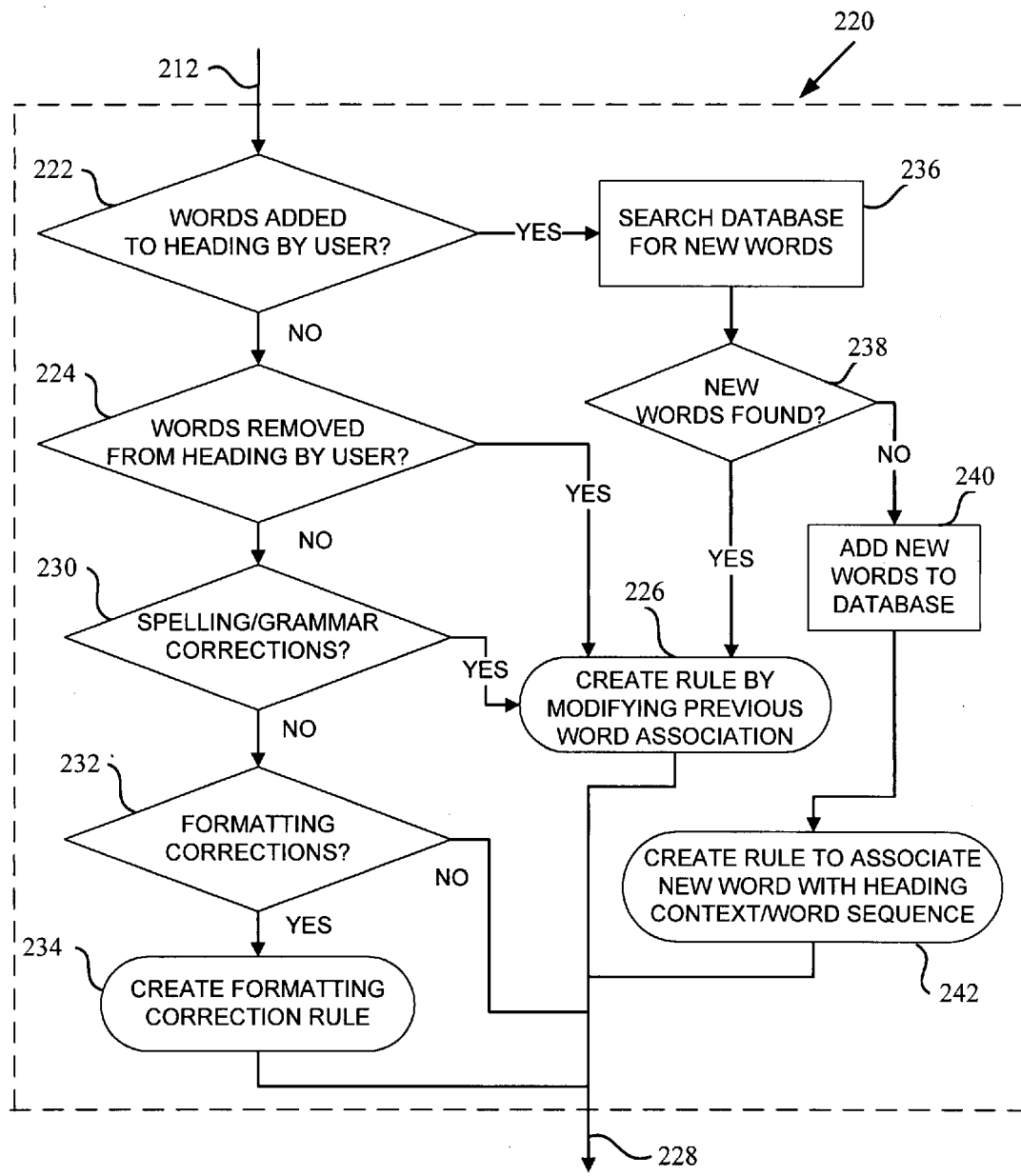
FIG. 8 illustrates a flow diagram of steps for creating heading rules according to an embodiment of the method for summarizing natural language text.

FIG. 8 illustrates a flow diagram of an embodiment of step 220. As indicated by flow path 212, step 220 may begin at step 222, where a determination is made, based on the comparison in step 200, whether any additional words appear in the user-created heading that do not appear in the computer-created heading. If no additional words appear, step 224 involves a determination as to whether any words were removed from the computer-created heading and do not appear in the user-corrected heading. If so, step 226 involves the creation of one or more new heading rules to account for the removal of words from the computer-created heading by the user. The creation of the new heading rules may occur by modifying one or more previous word associations to reflect the user change or by creating a separate heading rule. Following step 226, step 220 ends and method 200 may proceed to step 250 via flow path 228.

Referring back to step 224, if a determination is made that no words were removed from the computer-created heading by a user, step 220 proceeds to step 230, where a determination is made whether any spelling and/or grammar corrections were made to the computer-created heading by a user. If corrections were made, step 220 proceeds to create a new rule at step 226. If no corrections were made, step 220 proceeds to step 232, where a determination is made whether any formatting corrections were made to the computer-created heading. Underlining, bolding, and italicizing are some examples of formatting corrections. If formatting corrections were made by a user, step 220 creates a formatting correction rule at step 234. Following step 234, step 220 ends and method 200 may proceed to step 250 via flow path 228. If no formatting corrections have been made, step 220 concludes and method 200 may proceed to step 250 via flow path 228. A determination that no formatting corrections have been made is a determination that no corrections have been made by the user such that a new rule needs to be created by method 200.

Referring back to step 222, if a determination is made that words are contained within the user-modified heading that do not appear in the computer-created heading, step 220 proceeds to step 236. At step 236, a database is searched for the new words. After step 236, step 238 involves a determination whether the new words were found in a database, knowledge base, associative memory, or other data storage. The words may be stored in the database or other data storage based on frequency of occurrence in a selected number of other previously examined bodies of texts. If the new words are found, step 220 proceeds to step 226 where a new rule is created by modifying a previous rule associated with that word. If the new words are not found, step 220 proceeds to step 240 where the new words are added to the database. Next, step 242 involves the creation of a new rule to associate the new word with the text context and/or word sequence of the original body of text. Following step 242, step 220 ends and method 200 may proceed to step 250 via flow path 228.

Figure 9:
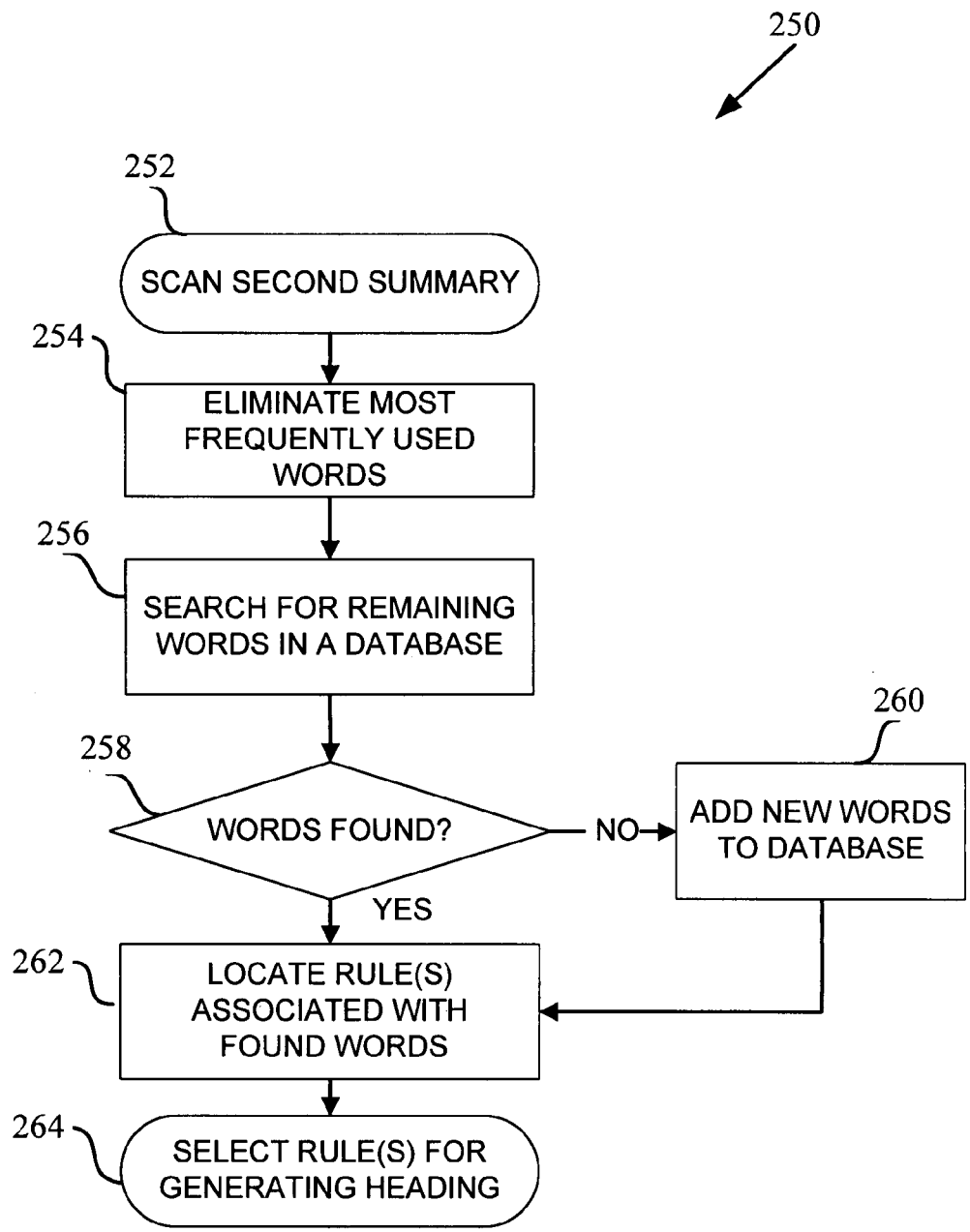
FIG. 9 illustrates a flow diagram of steps for selecting heading rules according to an embodiment of the method for summarizing natural language text.

FIG. 9 illustrates a flow diagram of an embodiment of step 250 of method 200. Step 250 may begin at step 252, where a second summary is received from a source and scanned. The source may be any person, entity, computer, or other means of delivering a body of text. The second summary is a different summary than the first summary and may be any summary of natural language text in any language. Natural language text may be all text that is not solely machine readable. Examples of natural language bodies of texts include newspaper articles, books, criminal incident reports, and emails. The summary received may be of various word lengths. In one embodiment, the summary may contain 50-100 words. In other embodiments, the summaries may contain fewer words or more words. In some implementations of method 200, the entire summary may be scanned before step 250 proceeds. In other implementations, only a portion of the summary may be scanned before step 250 proceeds. A portion may comprise a few words, a group of words, sentences, paragraphs, or pages of text. After a summary is received, the words may be normalized to better reflect the true commonality of their semantics. For example, the word "hi" may be normalized to the word "hello" to reflect the use of a word with the same meaning as "hello". Normalization ensures accurate word semantic-frequency determinations. Further, sentence normalization may also occur to improve the quality of English usage from user-supplied sentential corrections. Normalized sentences provide for more effective use of word frequency counts because the sentences randomize the representation of sentential semantics having the same relative frequency and context of use, while syntax may be different.

Next, step 254 may involve eliminating from the summary the most frequently used words that do not relate to the specific context of the summary. Eliminating the most frequently used words may produce an altered summary that comprises the least frequently used words. For example, step 254 may involve the elimination of words such as "a, an, in, of, to, and the" from the summary. The most frequently used words may be stored in a database or other data storage medium based on frequency of occurrence in a selected number of other summaries. In some embodiments, special purpose hardware, such as associative memory, may be used to store the most frequently used words. As another example, a domain-dictionary hash table may be created and maintained to keep a global frequency count of the words and/or word sequences encountered in the body of texts. One embodiment of step 250 does not track numbers, addresses, dates, and data of a similar kind in the hash table. The hash table may be implemented using a transposition, least-frequently used, abstract data type methodology to limit spatial requirements. Words and/or word sequences may be stored in the hash table where the top position is designated as, n, where n is the limiting size of the hash table. Each entry may be associated with an ordered pair (i.e. length, position), where the position number is necessarily unique. The first position to be filled is assigned n for its position number. The use of transposition enables the updating of recorded positions by swapping them. The hash queue is filled from the bottom until "n" entries have been made. Thereafter, a word and/or word sequence may replace the first word and/or word sequence encountered in a bottom-up search if and only if its length is less than or equal to that of the one it replaces. If the list length is limited, the least frequently used words may be deleted from the bottom of the list.

The words and/or word sequences stored in the data storage may be stored based on the frequency of occurrence within a plurality of previously examined summaries. In one embodiment of step 250, the previously examined summaries may be related to the summaries for which headings are being generated for. For example, the summary from which a heading will be generated may be contextually related to the previously examined summaries. Each time a summary is scanned that has not been previously scanned the words and/or word sequences in the hash table or other storage medium are updated to reflect the occurrence of each word and/or word sequence in the summary. Each scanned word in the summary may be associated with a frequency of occurrence value from the hash table. In an embodiment using a hash table, the relative frequency of occurrence may be determined by a word's positioning within the hash table. As an example, the most frequently occurring words will have higher positions within the hash table. Each word that does not have a frequency value above a certain threshold will be removed from the summary. The words are processed in order by hashing the constituent words in non-increasing order of length of word sequence (i.e., a most-specific-first paradigm). These subsequences are deterministic. There are $n(n+1)/2$ subsequences for n words in a sentence.

After enumerating, each subsequence, including spaces, is hashed to see if it is found in the domain-dictionary table. If it is found, the matched subsequence is transposed up one and its position is increased by one. If not found, it is added to the table. Each word or sequence of words is paired with its starting position number in the domain-dictionary hash table. If the starting position number is not found, zeros are assigned to the position number for the word or sequence of words, meaning that the words or sequence of words have not occurred before in a summary. Words or word sequences that contain zeros for position number are the last words to be eliminated from the summary to produce searchable words/keywords/sequence of words.

The frequency of occurrence threshold level may vary depending on the level of summarization desired by the user. For example, users that desire short and broad headings of lengthy summaries may set the threshold level very low, so only the words that rarely appear in summaries will remain in the summaries. A low threshold level ensures that the words that remain in the body of text are unique to the particular body of text. If a high threshold level is set, many words will not be eliminated because they occur frequently. A high threshold level may allow for the creation of lengthy and more detailed summaries of bodies of text. Step 254 may also include the step of eliminating commonly used expressions from the body of text that do not relate to the specific context of the body of text. For example, step 254 may involve the elimination of expressions such as "on the other hand", "by the way", and other frequently used expressions.

After the most frequently occurring words and/or expressions have been eliminated from the summary, the resulting altered summary will comprise words that more specifically reflect the particular subject matter embodied by the summary. These remaining words may then be used to determine the rules for generating a heading for the summary. At step 256, step 250 searches a database, hash table, associative memory, or other data storage for one or more of the remaining words. In one embodiment, this data storage may be the same data storage as that which contains the frequency of occurrence values. In another embodiment, this data storage may be a separate data storage, such as a least frequently used word data storage containing least frequently used words. In one embodiment, some of the remaining words are concatenated and combined into keywords and each keyword may be searched for in the database. The keywords may serve as a memory for the original sentence from which the words were combined. In another embodiment, each of the remaining words may be searched for in the database separately. In a further embodiment, several words are combined into strings or groups of words, with each string or group of words searched for in the database. The remaining words may be combined using various methods, such as a combination by sequence of occurrence in the summary or a combination according to the context within which the word is used.

Step 258 may next involve making a determination as to whether the remaining word or words are found within the database. If the word or words are not found, step 260 involves adding the words to the database. The words that are added to the database will have a low frequency of occurrence value because they were not located in the database. After the words are added, or if the words are found in the database, step 250 next locates the heading rules associated with each of the found word or words at step 262. While there may be one or more heading rules associated with each word, unless the words were newly added, there may also be heading rules that are not triggered by the appearance of one word. For example, a string or group of words may be required to exist before a heading rule may be applied. The heading rules are created from previously generated headings. In one embodiment, numerous cohesive summaries must be received and processed to create heading rules to be used by step 250. The heading rules govern the language to be used in the generated heading. For example, a heading rule may be created such that when the word "gun" appears in the context of a summary about crime, a heading rule associated with the word "gun" may cause the language "violent crime" to be included in a generated heading for the summary. Next, step 264 involves selecting the heading rules for generating the heading. Step 264 may involve determining which of the located heading rules to apply to generate the heading, and is explained more with reference to FIG. 10.

Figure 10:
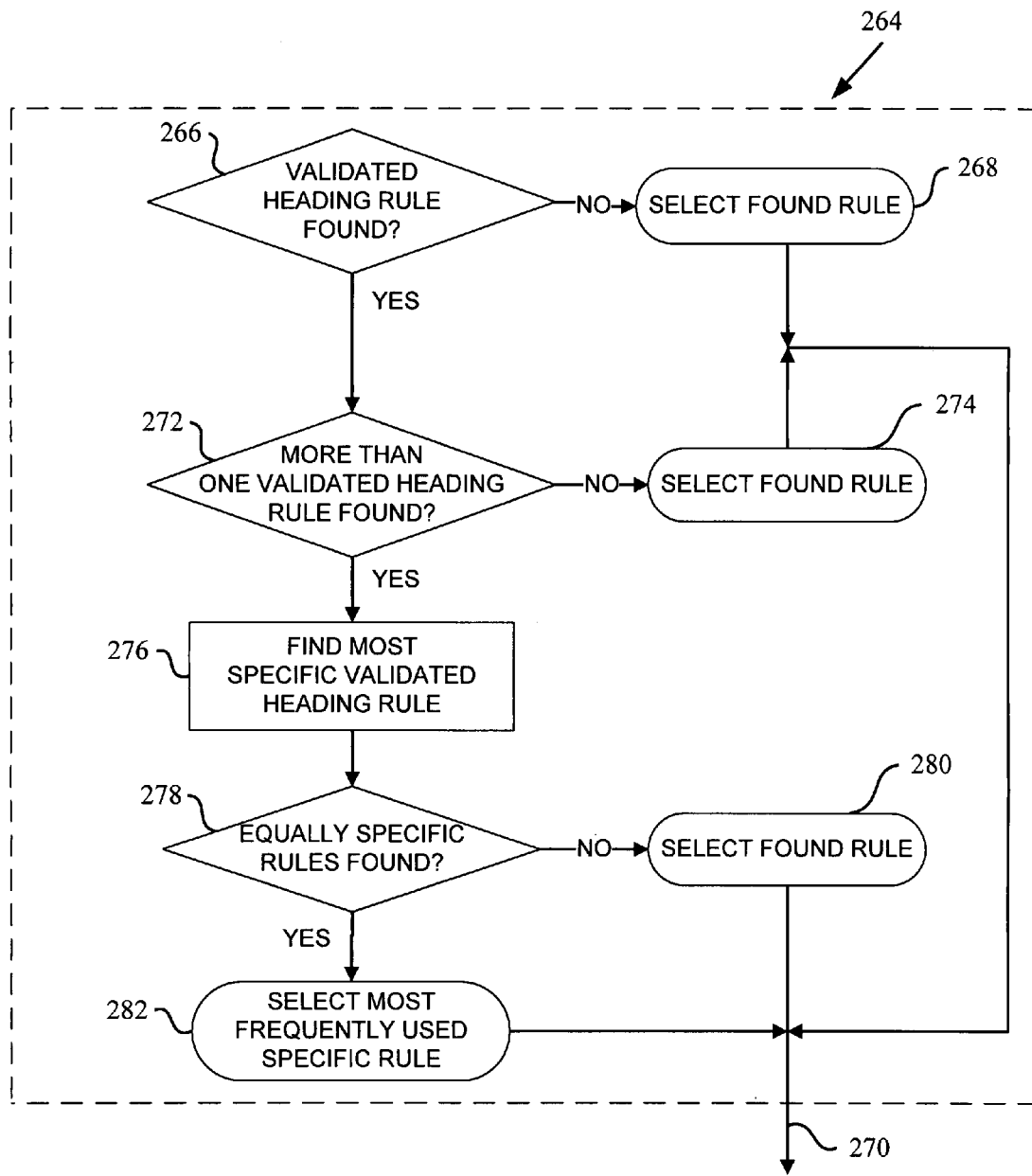
FIG. 10 illustrates a flow diagram of steps for selecting heading rules according to an embodiment of the method for summarizing natural language text.

FIG. 10 illustrates a flow diagram of an embodiment of step 264. In one implementation, the heading rules are selected based upon the words and/or group of words of the summary. Step 264 may begin at step 266, where it is determined whether a validated heading rule is found. A validated heading rule is a heading rule that has been created and correctly used at least once in the generation of a computer-created heading. A computer-created heading is a heading of a body of text that is created by a computer running software encompassing an embodiment of method 200 or having an embodiment of method 20 stored on a computer readable medium operatively connected to the computer. If a validated heading rule is not found, step 268 involves selecting the most specific non-validated heading rule. Non-validated heading rules are heading rules that have been created, but have not been used in the generation of a computer-created heading. In one implementation of method 200, the non-validated heading rules do not conflict with the validated heading rules, meaning that the non-validated heading rules are not contrary to, or in any way in disagreement with, the validated heading rules. After step 268, step 264 concludes, and method 200 may proceed to step 300 along flow path 270. Referring back to step 266, if a validated heading rule is found, step 272 next involves a determination as to whether more than one heading rule is found in the database or data storage. If not, meaning that only one heading rule was found, step 274 involves selecting the heading rule found. After step 274, step 264 concludes, and method 200 may proceed to step 300 along flow path 270.

If more than one heading rule is found in the database, step 276 involves finding the most specific heading rule. The most specific heading rule covers the broadest context of the body of text. The application of the most specific heading rule will provide the optimum and most efficient computer-created heading for a given summary. Step 278 next involves a determination as to whether equally specific rules have been found. If not, there is one most specific heading rule, which is selected at step 280. After step 280, step 264 concludes, and method 200 may proceed to step 300 along flow path 270. If equally specific heading rules have been found, step 282 involves selecting the most frequently used specific heading rule. The database or knowledge base where the heading rules are stored, or a separate data storage, may contain information indicative of how frequently a particular heading rule is used in the generation of a computer-created heading. After the most frequently used most specific heading rule has been selected at step 282, step 264 concludes, and method 200 may proceed to step 300 along flow path 270.

Figure 11:
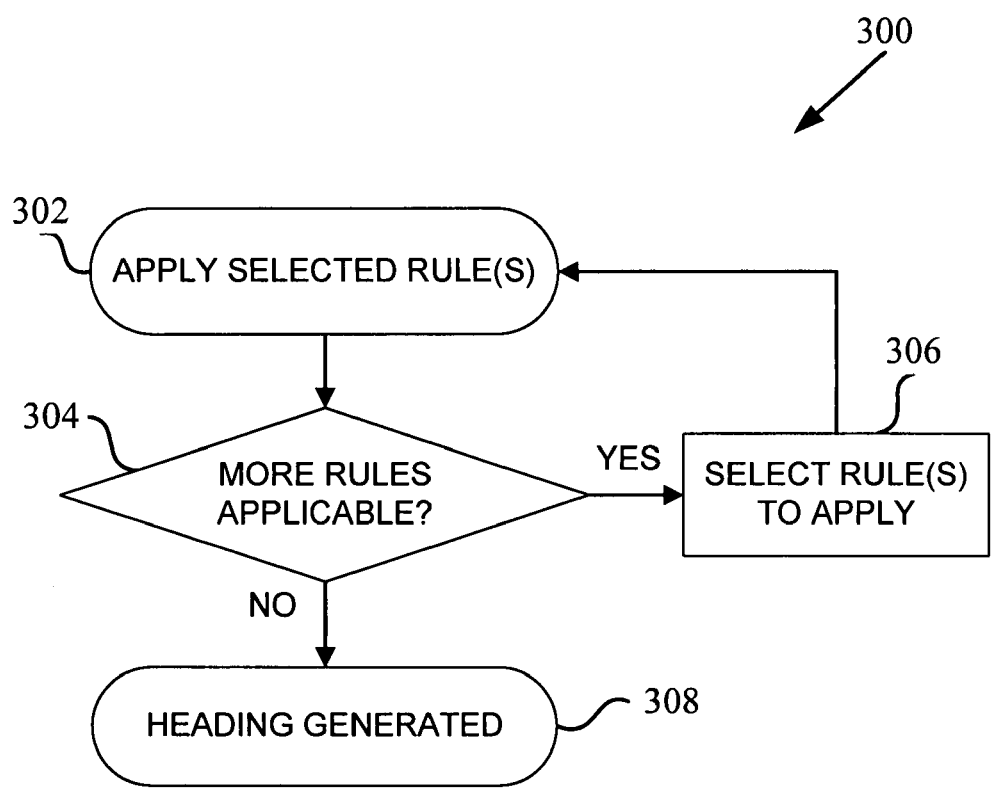
FIG. 11 illustrates a flow diagram of steps for applying selected heading rules to generate a heading for a summary according to an embodiment of the method for summarizing natural language text.

FIG. 11 illustrates a flow diagram of an embodiment of step 300. Step 300 involves applying the selected heading rules to the second summary to generate a computer-created heading of the second summary. Step 300 may begin at step 302, where the selected heading rules are applied to the second summary. Application of the selected heading rule may modify the summary to produce a partial or complete heading of the summary. The level of contraction of the summary into a heading may vary depending on the scope of applicability of the rule applied. For example, broad rules may be applied that drastically contract the summary, whereas narrow rules may be applied that perform minor contraction of the summary. In one implementation, a rule may be applied to the summary before the entire summary is scanned. For example, if a portion of the summary may be scanned and a rule may be selected based upon the scanned portion, the selected rule may be applied before the rest of the text is scanned. Step 302 may involve the application of the selected heading rules in the proper sequence to produce the heading. In one embodiment, step 302 may involve iteratively applying the selected heading rules based on the context and/or sequence of the words of the summary. This iterative application of the heading rules may involve applying various selected heading rules, one or more times, in a particular sequence or not in a particular sequence, to produce a completed heading. In other embodiments, step 302 may involve iteratively applying the selected heading rules based upon rule validation status, specific relation of the selected heading rules to the context of the words of the second summary, and/or frequency of use of the selected heading rules to generate computer created headings for summaries of text.

After step 302, step 304 involves a determination whether more heading rules may be applied to the second summary in the generation of a heading of the second summary. The determination at step 304 may be made by scanning the heading rule database or other heading rule storage to determine if more heading rules may be applied to the second summary. In another embodiment, step 304 may proceed in the same manner as step 250 to determine a heading rule to select. If more heading rules may be applied, step 306 involves selecting the heading rules to apply to the second summary. Following step 306, step 300 proceeds to step 302 where the newly selected heading rules may be applied to the second summary. Step 300 may be iteratively repeated until a determination is made at step 304 that there are no more heading rules that may be applied to generate a heading of the summary, meaning that a heading has been generated based upon the available heading rule base. If it is determined at step 304 that there are no more applicable heading rules for generating a heading of the second summary, method 300 concludes at step 308, where it is determined that a correct heading has been generated.

The heading may be a computer-created heading produced by a computer having method 200 stored thereon or stored on a removable storage device operatively connected to the computer. A computer may be any machine that can be programmed to manipulate data and/or symbols. In one embodiment, the proper sequence of applying the heading rules may be determined by the order in which the words/keywords associated with the heading rules appear in the modified body of text. In this embodiment, the context-free words/keywords may serve as an associative memory for the original body of text sentences. During the heading generation process, the language associated with each heading rule may be normalized to ensure proper English language usage. Spelling and punctuation may be corrected during the heading generation process after the language has been properly ordered.

Figure 12:
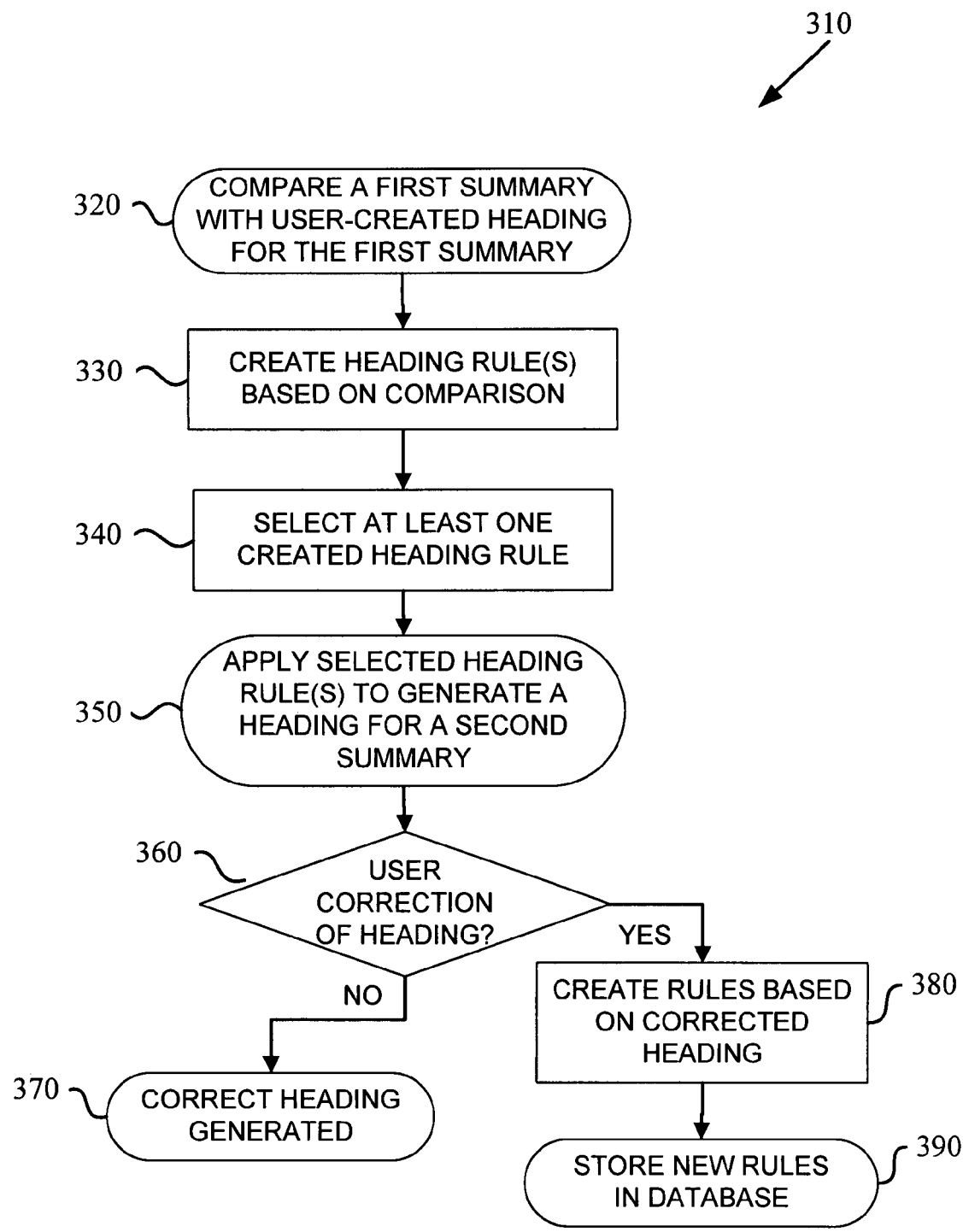
FIG. 12 illustrates a flow diagram of another embodiment of a method for generating a heading of a summary according to the method for summarizing natural language text.

FIG. 12 illustrates a flow diagram of another embodiment of a method for generating a heading of a summary 310. Method 310 may begin at step 320, where a first summary is compared with a user-created heading of the first summary. The first summary may be any body of natural language text in any language. Natural language text may be all text that is not solely machine readable. Examples of natural language text may include newspaper articles, books, criminal incident reports, and emails. Next, step 330 may involve creating one or more heading rules based on the comparison of the first summary with the user-created heading of the first summary. Following step 330, step 340 may involve selecting at least one of the one or more heading rules for generating a computer-created heading of a second summary. Method 310 may then proceed to step 350, where the selected heading rules are applied to the second summary to generate a computer-created heading of the second summary. Steps 320, 330, 340, and 350 may be performed in the same manner as their respective steps of method 10, namely steps 20, 30, 60, and 100.

Following step 350, method 310 may proceed to step 360. Step 360 may involve determining whether a user has corrected the computer-created heading. In one implementation, user correction may only occur when the program is in "learn mode". If the program is not in "learn mode", the program may generate headings that may not be edited by a user. If a user has not corrected the heading, step 370 may involve a conclusion that the method has generated a correct heading. If a user has corrected the heading, step 380 involves creating new heading rules based on the user modifications or corrections to the computer-created heading. As used herein, the term modified may include created. Similarly, the modification of existing rules falls within the scope of rule creation as performed in step 380. Headings that have been corrected by a user are referred to herein as "user-corrected headings". Step 380 may involve modifying existing heading rules or creating new heading rules. One implementation of step 380 may proceed in the same manner as step 30 of method 10. Finally, method 310 may conclude with the new heading rules being stored in the database, knowledge base, associative memory, or other data storage at step 390. The heading rules may be stored within the data storage such that they are associated with one or more words, keywords, strings of words, and/or combinations thereof.

The level of assistance provided by method 200 and/or method 310 to assist a user in automatically generating a heading of a summary may be measured by the equation $f(s,t)=1-e^{-st}$. The variable s is a domain symmetry constant of proportionality, where $s \geq 0$. The greater the value of s, the more inherently compressible (i.e., symmetric) is the totality of summary cases learned. The variable t represents relative time, where $t \geq 0$. The variable f is a relative metric showing the degree of autonomous correct heading generation (i.e., where 1.0 denotes 100%) that occurs as a result of machine learning by method 200 and/or method 310. The equation $f(s,t)=1-e^{-st}$ may be used to plot a desired learning chart of method 200 and/or method 310.

The embodiments of methods 10, 110, 200, and 310 may be represented by computer readable programming code that is stored on and/or embodied within any computer readable medium. For example, embodiments of methods 10, 110, 200, and 310 may be programmed using Java, C, C++, or other programming language as recognized by one with ordinary skill in the art, and can be stored as a program within or on a floppy disk, CD-ROM, internal hard drive, external hard drive, or other commercially available storage medium that can be operatively connected to a computer.

The described embodiments are to be considered as illustrative and not restrictive. The invention is not limited to the particular embodiments described herein, but is capable of many embodiments with variations, modifications, and applications different than those described, without departing from the scope of the following claims.

I claim:

1. A computer-implemented method comprising the steps of:

eliminating, from a portion of a body of text, the most-frequently occurring words that do not relate to the specific context of the portion of the body of text;

searching a data storage having a plurality of words and at least one summary rule associated with each word stored therein, for the remaining words within the portion of the body of text;

selecting, from the data storage, one of the summary rules associated with each remaining word found in the data storage, wherein
    if more than one summary rule is associated with one of the remaining words, a validated summary rule is selected over a non-validated summary rule,
    if more than one validated summary rule is associated with one of the remaining words, the validated summary rule that covers the most-specific context of the remaining word is selected, and
    if equally-specific validated summary rules are associated with one of the remaining words, the most-frequently-used validated summary rule that covers the most-specific context of the remaining word is selected;

creating a computer-generated summary by applying the selected summary rules to the body of text;

determining that a user has made user corrections to the computer-generated summary;

creating one or more new summary rules based upon the user corrections by
    modifying one or more existing associations of a word and a summary rule stored in the data storage to reflect the user corrections if the user added one or more words to the computer-generated summary that are stored in the data storage, removed one or more words from the computer-generated summary, or performed spelling/grammar corrections to the computer-generated summary, and
    creating a new association of a word and a summary rule if the user added one or more words to the computer-generated summary that are not stored in the data storage, the new association associating the non-stored word with a word sequence from a portion of the computer-generated summary; and storing the one or more new summary rules in the data storage.

2. The computer-implemented method of claim 1 further comprising the step of, prior to eliminating the most-frequently occurring words from the portion of the body of text, normalizing the words of the portion of the body of text.

3. The computer-implemented method of claim 1 further comprising the step of, prior to eliminating the most-frequently occurring words from the portion of the body of text, eliminating commonly used expressions from the portion of the body of text.

4. The computer-implemented method of claim 1, wherein the portion of the body of text is a sentence.

5. The computer-implemented method of claim 1, wherein the portion of the body of text is a paragraph.

6. A non-transitory computer-readable medium having a method stored thereon, the method represented by computer readable programming code, the method comprising the steps of:
    eliminating, from a portion of a body of text, the most-frequently occurring words that do not relate to the specific context of the portion of the body of text;
    searching a data storage having a plurality of words and at least one summary rule associated with each word stored therein, for the remaining words within the portion of the body of text;
    selecting, from the data storage, one of the summary rules associated with each remaining word, wherein
        if more than one summary rule is associated with one of the remaining words, a validated summary rule is selected over a non-validated summary rule,
        if more than one validated summary rule is associated with one of the remaining words, the validated summary rule that covers the most-specific context of the remaining word is selected, and
        if equally-specific validated summary rules are associated with one of the remaining words, the most-frequently-used validated summary rule that covers the most-specific context of the remaining word is selected;
    creating a computer-generated summary by applying the selected summary rules to the body of text;
    determining that a user has corrected the computer-generated summary;
    creating one or more new summary rules based upon the user corrections by,
        modifying one or more existing associations of a word and a summary rule stored in the data storage to reflect the user corrections if the user added one or more words to the computer-generated summary that are stored in the data storage, removed one or more words from the computer-generated summary, or performed spelling/grammar corrections to the computer-generated summary, and
        creating a new association of a word and a summary rule if the user added one or more words to the computer-generated summary that are not stored in the data storage, the new association associating the non-stored word with a word sequence from a portion of the computer-generated summary; and
    storing the one or more new summary rules in the data storage.

\* \* \* \* \*